(12) United States Patent
     Lawandy

(10) Patent No.: US 9,892,290 B2
(45) Date of Patent: Feb. 13, 2018

(54) SYSTEMS AND METHODS OF USING MAGNETIZATION TO AUTHENTICATE PRODUCTS

(71) Applicant: Spectra Systems Corporation, Providence, RI (US)

(72) Inventor: Nabil Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 0 days.

(21) Appl. No.: 14/323,527

(22) Filed: Jul. 3, 2014

(65) Prior Publication Data

US 2016/0004889 A1 Jan. 7, 2016

(51) Int. Cl.
*G06F 17/00* (2006.01)
*G06K 7/08* (2006.01)
*G06K 19/06* (2006.01)

(52) U.S. Cl.
CPC ....... *G06K 7/087* (2013.01); *G06K 19/06196* (2013.01)

(58) Field of Classification Search
CPC .............................. G06Q 10/087; G06Q 10/08
USPC ................... 235/375, 385, 462.45, 472.01
See application file for complete search history.

(56) References Cited

U.S. PATENT DOCUMENTS

| 3,772,200 | A | 11/1973 | Livesay |
| 5,306,899 | A | 4/1994 | Marom et al. |
| 5,980,501 | A | 11/1999 | Gray |
| 6,904,525 | B1 | 6/2005 | Berson et al. |
| 8,500,015 | B2 | 8/2013 | Grant et al. |
| 8,550,336 | B2 | 10/2013 | Wang et al. |
| 2002/0143571 | A1* | 10/2002 | Messina ............................ 705/1 |
| 2003/0136837 | A1 | 7/2003 | Amon et al. |
| 2003/0138128 | A1* | 7/2003 | Rhoads ........................ 382/100 |
| 2005/0019556 | A1 | 1/2005 | Freeman et al. |
| 2006/0102721 | A1* | 5/2006 | Goetz ........................... 235/440 |
| 2007/0056041 | A1* | 3/2007 | Goodman ...................... 726/26 |
| 2012/0242460 | A1 | 9/2012 | Swiegers et al. |
| 2013/0087620 | A1* | 4/2013 | Sharma et al. .......... 235/472.01 |
| 2013/0284807 | A1 | 10/2013 | Fullerton et al. |
| 2015/0002915 | A1* | 1/2015 | Lebaschi .................. H04N 1/56 358/538 |

OTHER PUBLICATIONS

International Preliminary Report on Patentability Chapter I in PCT/US2015/039088 (dated Jan. 3, 2017).
Written Opinion of the International Searching Authority in PCT/US2015/039088 (dated Nov. 27, 2015).

* cited by examiner

*Primary Examiner* — Daniel St Cyr
(74) *Attorney, Agent, or Firm* — Pryor Cashman LLP

(57) ABSTRACT

Systems and methods for authenticating a product using a magnetic code are disclosed. The systems and methods include detection of a magnetic code on the product using a device comprising a magnetometer, correlating the detected magnetic code to a symbolic code, determining whether the symbolic code matches a symbolic code stored in a database, and receiving, by the device, a signal indicating that the product is authentic if the symbolic code matches a symbolic code stored in the database.

29 Claims, 7 Drawing Sheets

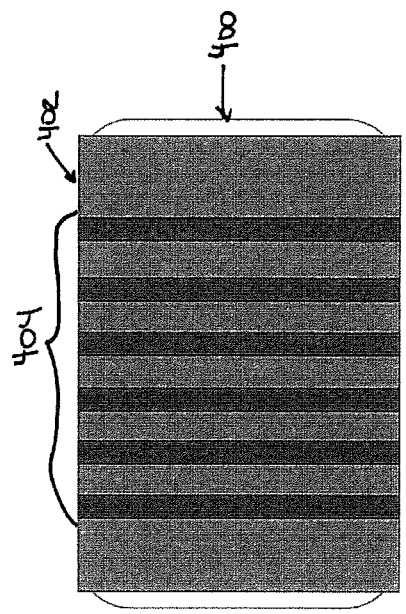
FIG. 5B
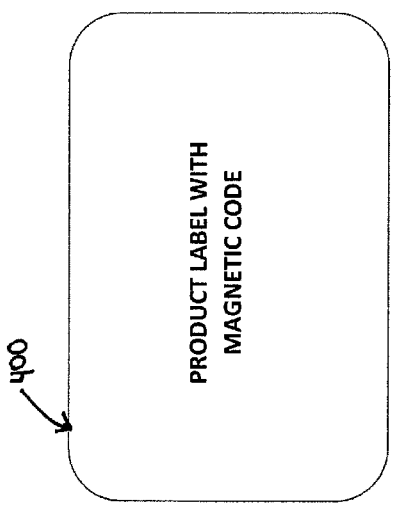
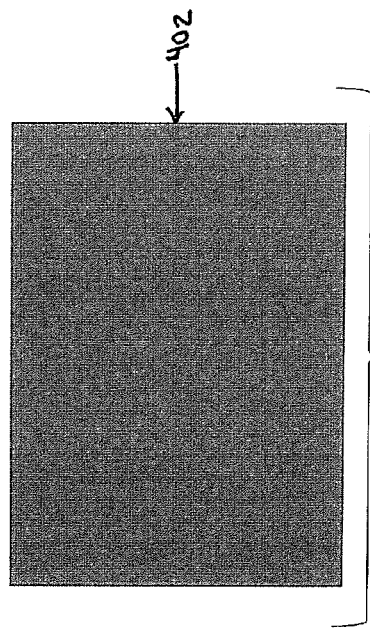
FIG. 5A

SYSTEMS AND METHODS OF USING MAGNETIZATION TO AUTHENTICATE PRODUCTS

TECHNICAL FIELD

The present invention relates generally to systems and methods for authentication of products. More specifically, the present invention relates to using of magnetization to create and decipher codes on products stored in magnetized media, and scanning the codes to confirm that the products are authentic.

BACKGROUND OF THE INVENTION

Counterfeiting of consumer products is a growing concern. For example, products such as liquor, automotive parts, and household items have been the subjects of counterfeiting. Generally, counterfeiters package a product in the same manner as the authentic product; however, the counterfeit product will be of inferior quality. Consumers unknowingly purchase the counterfeit products, which has an adverse impact on both the consumer and on the business entities producing the authentic products.

Several techniques have been developed to prevent counterfeiting. For example, makers of the authentic products have attempted to place specific markings or stamps on labels of their products. However, these techniques are identifiable by counterfeiters and are able to be circumvented. Another technique employed by product manufacturers is the addition of RFID tags to product labels. The addition of an RFID tag to each product drives up the cost of the product, and the technology needed to identify the data transmitted by each RFID tag is not readily available to consumers.

There is, therefore, a need to employ a cost-effective and accurate manner of identifying authentic products that is accessible and easy to use so that consumers will confidently know they are purchasing authentic products.

SUMMARY OF THE INVENTION

It is an object of the present invention to provide a method for authenticating a consumer product using a magnetic code. It is a further object of the present invention to provide a method for printing a detectable magnetic code on a product.

In general, in one aspect, the invention features a method for authenticating a product using a magnetic code. The method may include detecting a magnetic code on the product using a device including a sensor, correlating the detected magnetic code to a symbolic code, determining whether the symbolic code matches a symbolic code stored in a database, and receiving, by the device, a signal indicating that the consumer product is authentic if the symbolic code matches the symbolic code stored in the database.

Implementations of the invention may include one or more of the following features. The sensor may include a Hall Effect sensor. The sensor may include a magnetometer. The device may include a personal computing device. The personal computing device may include a smartphone. The smartphone may include a surface substantially covered in a material having a high magnetic permittivity and an opening in the surface to detect the magnetic code. The material may include mu-metal. The magnetic code may include a barcode encoded in a magnetized material. The magnetic code may include magnetized ink. The magnetized ink may be printed onto a label disposed on the product. The magnetic code may include a magnetized material with at least one piece of a high magnetic permittivity material disposed thereon. The device may be a machine configured to receive the product. The machine may be configured such that at least a portion of the machine will not function if the machine determines that the product is not authentic. The symbolic code may be a graphical image. The method may include scanning a QR code prior to detecting the magnetic code on the product. The signal indicating that the product is authentic may include an image. Detecting the magnetic code on the product may include detecting an orientation and/or a magnitude of a magnetic field pattern.

In general, in another aspect, the invention features a method of printing a detectable magnetic code on a product. The method may include covering a first portion of a surface of a magnetization unit with at least one piece of a material having a high magnetic permittivity, such that a second portion of the surface of the magnetization unit remains uncovered, placing the magnetization unit in contact with a piece of magnetizable material, such that a magnetic code may be created in the magnetizable material in a pattern corresponding to the second portion of the surface of the magnetization unit, and placing the piece of magnetizable material on the product, such that a device may be configured to detect the magnetic code.

Implementations of the invention may include on or more of the following features. The surface of the magnetization unit may be substantially planar. The surface of the magnetization unit may be round. The first portion of the surface of the magnetization unit may be covered with at least two pieces of material having a high magnetic permittivity. The pattern corresponding to the second portion of the surface of the magnetization unit may be a barcode. The magnetizable material may be disposed on product. The magnetizable material may be disposed behind a label on packaging of the product. The device may be configured to determine whether the product is authentic using the magnetic code. The device may compare the magnetic code using a code stored in a database.

In general, in another aspect, the invention features a method for authenticating a product using a magnetic code or image. The method may include visually detecting a magnetic code or image on a product using a magnetic optically sensitive material, scanning the visually detected magnetic code or image using a device, correlating the scanned visually detected magnetic code to a symbolic code, determining whether the symbolic code matches a symbolic code stored in a database, and receiving, by the device, a signal indicating that the product is authentic if the symbolic code matches the symbolic code stored in the database.

Implementations of the invention may include one or more of the following features. The visually detected magnetic code or image may be a barcode. The device may include a barcode scanner for scanning the visually detected magnetic code or image. The device may include a camera for scanning the visually detected magnetic code or image.

BRIEF DESCRIPTION OF THE DRAWINGS

The above-mentioned and other aspects, features and advantages can be more readily understood from the following detailed description with reference to the accompanying drawings, wherein:

FIGS. 5A-5B illustrate a system and method for authenticating a magnetic code, according to an embodiment of the invention;

DETAILED DESCRIPTION OF THE PREFERRED EMBODIMENTS

The present invention provides for systems and methods of using magnetization to authenticate products. More specifically, the present invention provides systems and methods of labeling products with magnetic codes and systems and methods of scanning products to determine whether the products are authentic. It should be noted that the present invention may be used with consumer products to prevent counterfeiting, but is not limited thereto. The present invention may be used in conjunction with any product where authentication may be desired.

In one aspect, the present invention provides systems and methods for creating magnetic codes on products. The magnetic codes may be coded patterns of magnetized material on a surface of the product and/or on a surface of the product packaging so long as the magnetic codes do not alter the quality of the product and the magnetic codes are configured to be used to authenticate the product. For example, in one embodiment, the magnetic codes may be printed directly onto the product label, the product surface and/or the packaging surface. Alternatively, or in addition, the magnetic codes may be printed onto a piece of material that may be attached to a product label, the surface of the product and/or a tag extending from the product.

Figure 1:
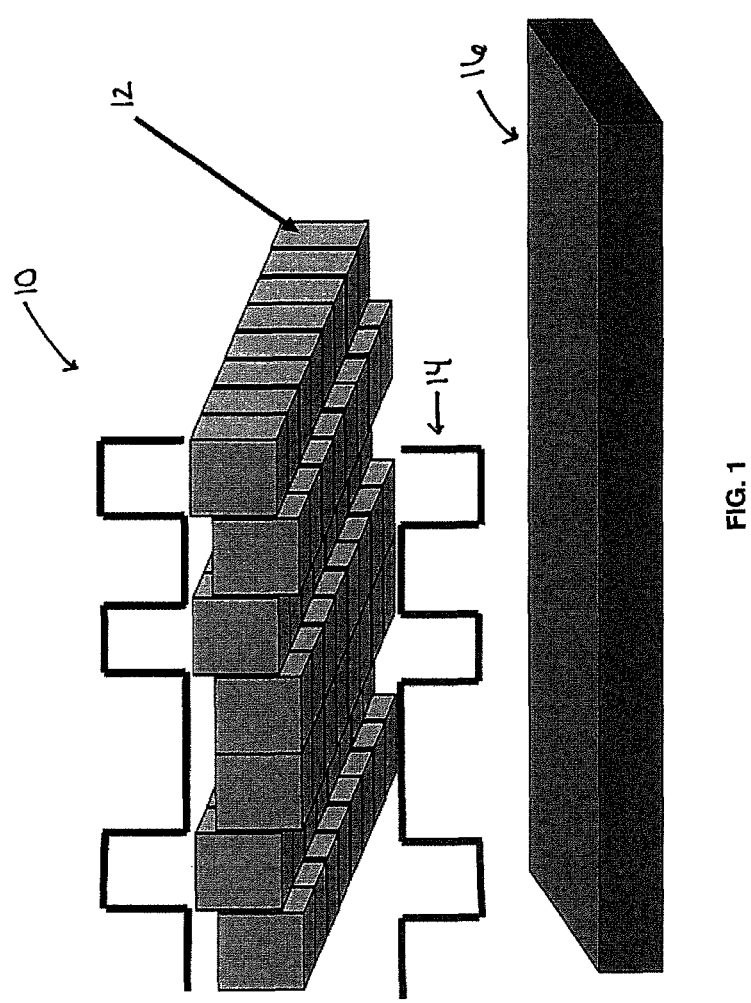
FIG. 1 is a diagram of an apparatus for printing a magnetic code onto a magnetizable material, according to an embodiment of the present disclosure.

FIG. 1 illustrates an apparatus 10 for printing a magnetic code onto a piece of material, according to an embodiment of the invention. As illustrated in FIG. 1, the apparatus 10 may include at least one magnetization unit 12 located within a magnetizing print head 14. The at least one magnetization unit 12 may be any magnet known to those skilled in the art and configured to magnetize a magnetizable material 16. The at least one magnetization unit 12 may be any size, shape and/or configuration known to those skilled in the art. For example, as illustrated in FIG. 1, the at least one magnetization unit 12 may have a rectangular surface configured to magnetize the magnetizable material 16, such that a one-dimensional or two-dimensional barcode or code, e.g. a QR code, may be printed onto the magnetizable material 16. In alternative embodiments, the magnetization unit 12 may have a different shape, e.g., a circle, ring, square, or any other shape, to form the desired magnetic code in the magnetizable material 16. FIG. 1 illustrates a plurality of magnetization units 12, each of which may be substantially the same size and shape. Alternatively, the plurality of magnetization units 12 may vary with respect to size and shape.

The at least one magnetization unit 12 may be configured to transition up and down within the magnetizing print head 14. In embodiments including a plurality of magnetization units 12, such as that illustrated in FIG. 1, each magnetization unit 12 may be configured to transition up and down within the magnetizing print head 14 relative to one another. The plurality of magnetization units 12 may be configured to transition up and down within the magnetizing print head 14 in a synchronized manner, such that each magnetization unit 12 may be configured to magnetize a portion of the magnetizable material 16 at substantially the same time. Alternatively, the plurality of magnetization units 12 may be configured to transition up and down within the magnetizing print head 14 in a non-synchronized manner. In some embodiments, for example, an apparatus user may be configured to program the print head and determine whether the magnetization units 12 transition up and down in the synchronized or non-synchronized manner.

The magnetizing print head 14 may include at least one opening in a surface thereof, e.g., the bottom surface. The at least one opening may be sized and shaped to allow at least one magnetization unit 12 to pass there through, such that the at least one magnetization unit 12 may be configured to magnetize a magnetizable material 16. The openings in the print head may be fixed or adjustable. For example, in one embodiment, an apparatus user may configure the position of the openings in the magnetizing print head 14 based on a desired pattern to print onto the magnetizable material 16.

Figure 2:
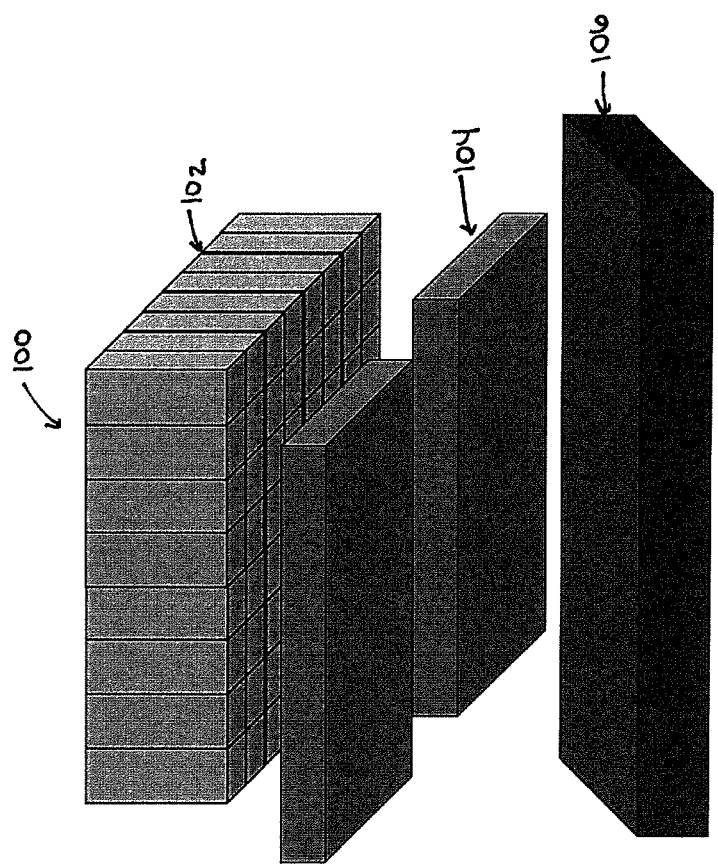
FIG. 2 is diagram of an apparatus for printing a magnetic code onto a magnetizable material, according to an embodiment of the present disclosure.

FIG. 2 illustrates an apparatus 100 for printing a magnetic code onto a piece of material, according to another embodiment of the invention. As illustrated in FIG. 2, the apparatus 100 may include a magnet, including, but not limited to, a permanent magnet or electromagnet. The magnet may be a single piece that may be configured to print a magnetic code in a magnetizable material 106. FIG. 2 illustrates a rectangular shaped magnet 102. In alternative embodiments, the magnetic 102 may be any desired shape, size and/or configuration. For example, in one embodiment, the magnet 102 may be a cylinder and may be configured to be rolled along a surface of the magnetizable material 106.

At least one piece of material with a high magnetic permittivity 104 may be placed along a bottom surface of the magnet 102, such that the exposed portions of the bottom surface of the magnet 102 may be in the form of a desired pattern for a magnetic code to be printed on the magnetizable material 106. The at least one piece of high magnetic permittivity material 104 may be any material known to those skilled in the art configured to shield the magnetic field projected from portions of the magnet 102 from magnetizing corresponding portions of the magnetizable material 106. For example, in one embodiment, the high magnetic permittivity material 104 may include, but is not limited to, a mu-metal.

FIG. 2 illustrates that multiple pieces of high magnetic permittivity material 104 may be placed along the bottom surface of the magnet 102. The piece or pieces of high magnetic permittivity material 104 may be any desired size, shape and/or configuration in order to create a desired magnetic code in the magnetizable material 106. For example, in some embodiments, such as illustrated in FIG. 2, the pieces of high magnetic permittivity material 104 may be substantially the same size and shape. In alternative embodiments, the pieces of high magnetic permittivity material 104 may vary with respect to size and/or shape.

As previously discussed, authentication of a product may be accomplished by attaching the magnetizable material 16, 106 that has been printed with a magnetic code to the product label, the surface of the product and/or a tag extending from the product. For example, in one embodiment, after a magnetic code, unique to a product, is printed onto the magnetizable material 16, 106, the magnetizable material 16, 106 may be attached to a surface of the product packaging, directly behind and shielded by the product label. Alternatively, the magnetizable material 16, 106 may be placed between two layers of the product label or a tag extending from the product label, so as to hide the magnetizable material 16, 106 therebetween.

The present invention may include positioning the magnetizable material 16, 106 on a product label, the surface of the product, the product packaging, and/or a tag extending from the product after the magnetizable material 16, 106 has been printed with a magnetic code. In alternative embodiments, the product may be produced with at least one piece of magnetizable material 16, 106 on the product label, the surface of the product, the product packaging, and/or a tag extending from the product before the magnetizable material 16, 106 has been printed with a magnetic code. In such embodiments, the magnetizable material 16, 106 may be positioned such that it may be printed with a magnetic code via at least one of the apparatus illustrated in FIGS. 1 and 2.

Alternatively, or in addition, the magnetic codes may be printed directly onto the product label, the product surface, a tag extending from the product and/or the packaging surface via ink. For example, a product label and/or a tag extending from the product may be produced with a magnetic material. The magnetic code may be provided on the magnetic material by patterning a surface thereof with a high magnetic permittivity material, including, but not limited to mu-metal. In alternative embodiments, the magnetic code may be printed directly onto a non-magnetic material that makes up at least one of the product label, the product surface, a tag extending from the product and/or the product packaging by using a magnetic ink to print a pattern thereon. In any of the embodiments, the ink may be printed onto the magnetic or non-magnetic material before or after the product label, tag and/or product packaging are positioned on the product.

In some embodiments, the material upon which the magnetic code is printed may be configured to be tamper proof. Tamper proof material may be any material known to those skilled in the art that may be configured such that after the material is adhered to a surface, an individual may be prevented from detaching the material in a manner that maintains the integrity of the material. For example, in the embodiments of FIGS. 1 and 2, the magnetizable material 16, 106 may be configured such that an individual may not be able to remove the material from the product while maintaining the magnetizable material 16, 106 and/or the magnetic code printed thereon intact. Similarly, in embodiments where the magnetic code is printed directly on a product label and/or a tag extending from the product, the product label and/or tag may be configured such that if an individual attempts to remove the label from the product or disassemble the tag, the product label and/or tag may break into multiple pieces, making it nearly impossible for a counterfeiter to recreate the label and/or tag.

Figure 6:
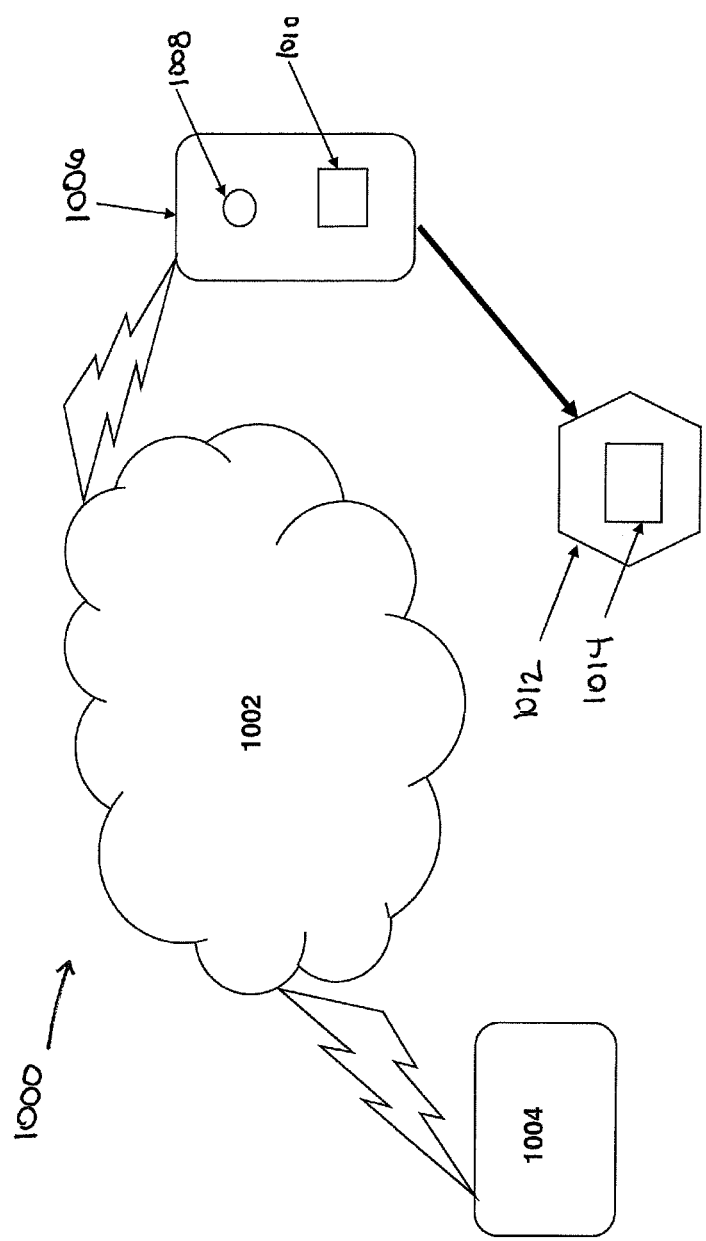
FIG. 6 illustrates a system for authenticating a product, according to an embodiment of the present disclosure.

In another aspect, the present invention provides for systems and methods for authenticating products using magnetic codes printed thereon. FIG. 6 illustrates a system 1000 for authenticating products, according to an embodiment of the invention. As illustrated in FIG. 6, a product 1012 with a magnetic code there on 1014 may be authenticated with a sensor 1008 configured to sense and record the strength of the magnetic fields emitted by the patterns of magnetizable material that form the magnetic codes. The sensor 1008 may be any sensor known to those skilled in the art configured to detect an emitted magnetic field. For example, the sensor 1008 may be a magnetometer or a Hall Effect sensor. As illustrated in FIG. 6, the sensor 1008 may be located in a device 1006 configured to read the magnetic code detected by the sensor and compare the detected magnetic code with magnetic codes stored in a database 1004.

Comparison of the detected magnetic code to the magnetic codes stored in a database may be accomplished via any means known to those skilled in the art. In some embodiments, products may be produced with a QR code thereon. A device user may use the device configured to detect the magnetic code to first scan the QR code and identify the product in a database. The QR code may be scanned using any means known to those skilled in the art, including, but not limited to, a camera, a barcode scanner, and/or other sensing means. The identified product may correlate to a magnetic code stored in the database. After scanning the QR code, a device user may then scan the product with the sensor to detect the magnetic code and determine whether the product is authentic. A product may be authentic when there is a match between the detected magnetic code and the magnetic code stored in the database that corresponds to the identified product.

In one embodiment, the device 1006 with the sensor may be configured to correlate the detected magnetic field to symbolic codes and match the symbolic code to symbolic codes stored in the database. Alternatively, or in addition, the device 1006 with the sensor may be configured to graphically represent the detected magnetic field and compare the graphical representation to graphical representations stored in the database. In order to detect the magnetic code, correlate the magnetic code to a symbolic code and/or graphical image, and match the symbolic and/or graphical image with one stored in a database, the device 1006 with the sensor may include at least one microprocessor 1010 and at least one transmitting means. The transmitting means may be any transmitting means known to those skilled in the art and configured to transmit the symbolic code and/or graphical image via a network 1002 to a remote database 1004 and receive a signal from the remote database corresponding to product authentication, such as devices used in WiFi and cellular communications.

Figure 3:
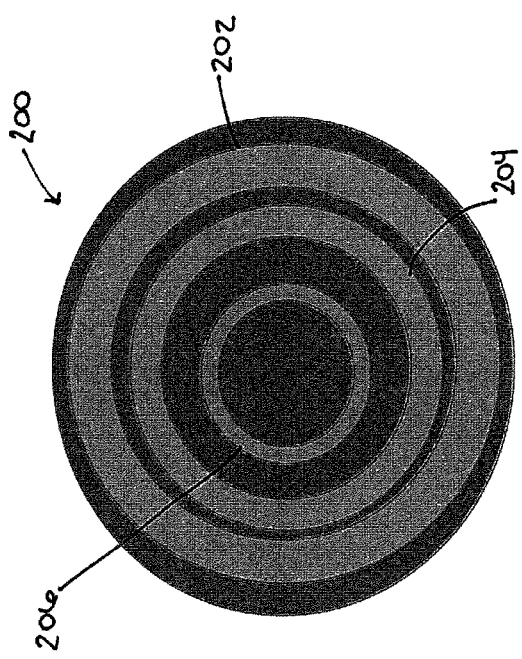
FIG. 3 illustrates a product with a magnetic code for authentication, according to an embodiment of the present disclosure.

FIG. 3 illustrates an example of an application of the invention disclosed herein. Generally, consumer device manufacturers may find it beneficial to ensure that only approved products are being used in conjunction with their devices. For example, the makers of a device may want to ensure that only approved products are being used in their devices. FIG. 3 illustrates an example of a product 200 that may be printed with a magnetic code and authenticated in a device.

For example, a portion of the product, illustrated in FIG. 3, may be patterned with a series of magnetic rings 202, 204, 206 corresponding to a magnetic code. The magnetic rings 202, 204, 206 may be printed by any of the means for creating a magnetic code discussed herein. The thickness of each ring 202, 204, 206 may correspond to a specific strength of magnetic field and/or symbolic code. For example, a code may be detected based on the thickness of each ring and the placement of the ring. The thickness of each ring may correspond to an emitted magnetic field having a detectable number and/or signal strength. For example, the signal strength detected from each ring 202, 204, 206 may correlate to a vector quantity having both a magnitude and a direction. A magnetic code may be formed based on the order of the rings and their detected vector quantities, i.e., both the magnitude and direction of the magnetic field emitted by each ring.

The product of FIG. 3 may be configured for use with a device including a sensor, such as the Hall Effect sensor previously discussed. In use, a consumer may position the product into the device, and the device may be configured such that it will only activate upon authenticating that the product in the device is an approved product.

Figure 4:
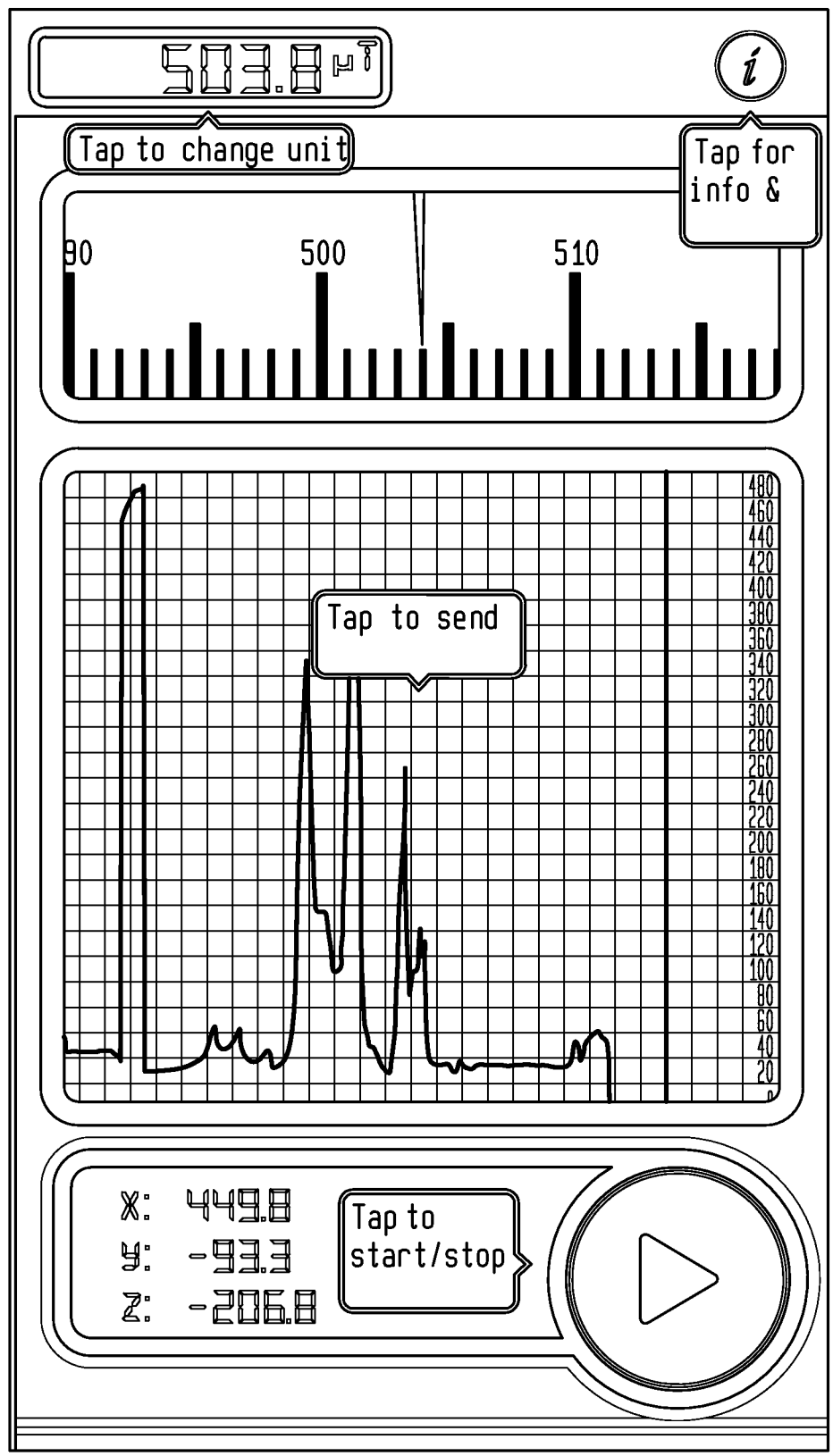
FIG. 4 is a diagram of an application for authenticating a product having a magnetic code, according to an embodiment of the present disclosure.

FIG. 4 illustrates another application of the invention disclosed herein. Generally, consumers may desire automatic authentication of products prior to purchase. This may be accomplished using an application 300 such as that illustrated in FIG. 4. The application 300 may be loaded onto any PDA, tablet, smartphone, or any other personal computing device known to those skilled in the art having a magnetometer therein and operating using a microprocessor. Upon choosing a product to authenticate, a consumer opens the application, taps the start button 304, and moves the PDA, tablet, or smartphone over a surface of the product. The magnetometer in the PDA, tablet, or smartphone may be configured to detect the magnetic code on the product.

Detection of the magnetic code on the product may be enhanced by a surface of the PDA, tablet, or smartphone substantially covered in a high magnetic permittivity material, including, but not limited to mu-metal, but having an opening in a portion of the surface adjacent to the PDA, tablet, or smartphone's magnetometer that does not include the high magnetic permittivity material. This configuration of the surface may result in a more accurate detection of the magnetic code on the product, because the high magnetic permittivity material may shield the magnetometer from sensing magnetic fields that are not part of the magnetic code on the product. The surface may be any piece of material or structure known to those skilled in the art, including, but not limited to, a back plate or a case.

Returning to FIG. 4, detection of the magnetic code may result in graphical representation of the magnetic code 302. The graphical representation may correspond to vector quantities associated with the magnetic code. For example, as previously discussed, because magnetization may be a vector quantity having a magnitude and direction, the graphical representation may correspond to a pattern of magnitudes and directions of magnetic fields corresponding to the detected magnetic code.

After detection of the magnetic code, the consumer may tap the detected image 302, which may be configured to initiate communication between the application 300 and a remote service having a database of stored magnetic codes. The server may receive the detected image 302 from the consumer's application 300 and may be configured to compare the detected magnetic code to codes stored in the database. If the detected magnetic code matches a code in the database, the server transmits a message to the consumer's application confirming that the scanned product is authentic. If the detected magnetic code does not match a code in the database, the server will transmit a message to the consumer's application indicating that authentication was not confirmed. The messages transmitted to the consumer's application may be any message known to those skilled in the art, including, but not limited to, visual, audible, and/or tactile.

The application 300 illustrated in FIG. 4 may include many variations. In one, embodiment, for example, a user of the application may not see the graphical representation of the magnetic code 302. Rather, the application may be configured such that after the user of the application scans a QR code on the product, the application transmits a message to the application user to begin scanning the product. The application may automatically communicate with a sever containing the database of stored magnetic codes upon completion of the scan, and may transmit a message to the user's application indicating the status of product authentication.

The message indicating the status of product authentication may include any message known to those skilled in the art, including, but not limited to, a visual, audible, and/or tactile message. In one embodiment, for example, the message may be an image of the product corresponding to the detected magnetic code. If the image of the product matches the image of the product scanned, then the scanned product may be authentic. If the image of the product corresponding to the detected magnetic code results in an error and/or does not match the image of the product scanned, then the scanned product may not be authentic. Further variations of the application 300 illustrated in FIG. 4 may include options for an application user to obtain information regarding the location of counterfeit products and/or information regarding the inventory of authentic products at various establishments.

The embodiments of FIGS. 3A-3B and 4 disclose detection of the magnetic code on products using a device having a sensor. In alternative embodiments, such as the embodiment illustrated in FIGS. 5A-5B, the magnetic code may be detected using a material that may be configured to optically transmit a magnetic code. FIG. 5A illustrates a product label 400 that has been printed with a magnetic code using any of the techniques disclosed herein. In alternative embodiments, the magnetic code may be printed on the product packaging, a tag extending from the product and/or a surface of the product.

As illustrated in FIG. 5A, the magnetic code may be detected using a magnetic optically sensitive material 402. The magnetic optically sensitive material 402 may be a material that may be configured to visually transmit a magnetic code 404 when the magnetic optically sensitive material 402 is placed over the product label 400 containing the magnetic code (e.g., FIG. 5B). For example, the magnetic optically sensitive material 402 may be a film configured to provide a visual display responsive to a magnetic field.

In some embodiments, the optically magnetic sensitive material 402 may be configured to visually represent the magnetic code as an image. Alternatively, or in addition, as shown in FIG. 5B, the optically magnetic sensitive material 402 may be configured to visually represent the magnetic code as a barcode 404. The barcode 404 may be configured to be scanned using a barcode scanner and/or a camera. The barcode scanner and/or camera may be configured to correlate the barcode to a symbolic code and communicate with a server having a database storing symbolic codes that correspond to particular products. Alternatively, the barcode scanner and/or camera may be configured to transmit the scanned barcode to the server, and the server may be configured to correlate the received barcode to the symbolic code. When a scanned bar code matches a bar code stored in the database, the product having the bar code may be authentic.

As with previously discussed embodiments disclosed herein, a QR code may be located on the product and may be scanned prior to scanning the bar code 402 that appears using the magnetic optically sensitive material 402. In addition, the device having the barcode scanner and/or camera may be configured to receive a message from the server having the database indicating the status of product authentication. The message may be any message known to those skilled in the art, including, but not limited to, audible, visual, and/or tactile.

Figure 7:
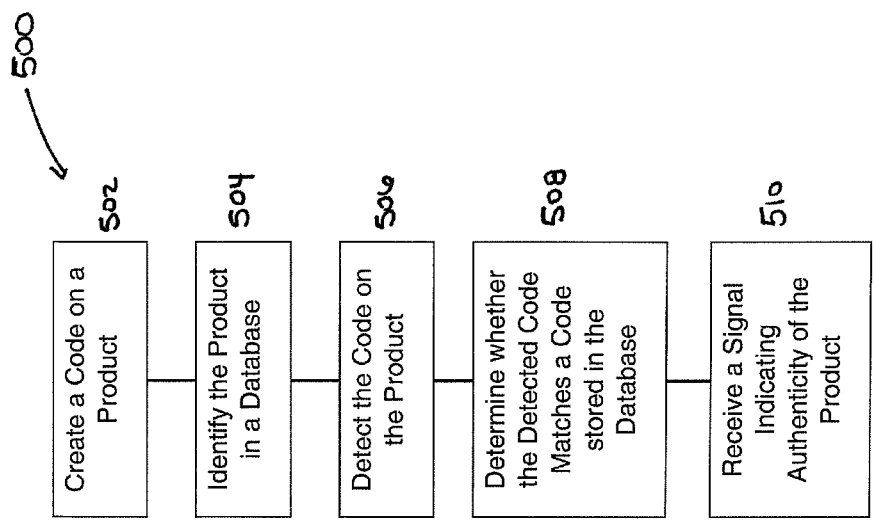
FIG. 7 illustrates a method for authenticating a product, according to an embodiment of the present disclosure.

FIG. 7 illustrates a method of authenticating a product, according to an embodiment of the invention. The method for authenticating a product 500 may first include creating a code, i.e., a magnetic code, on a product 502. The method 500 may further include identifying a product in a database 504. For example, as disclosed herein, a QR code on a product may be scanned and correlated with information corresponding to a particular product stored in a database 1004. A device may then be used to detect the code on the product 506. As illustrated in FIG. 6, the device may be in communication with a network 1002 and an external database 1004, such that the method may include the step of determining whether the detected code matches a code stored in the database 508. After completing the determination step, the method 500 may include receiving, with the device, a signal indicating authenticity of the product. The steps illustrated in FIG. 7 may be performed via any of the embodiments of the systems for creating a magnetic code and authenticating a product disclosed herein.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. The objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

What is claimed:

1. A method for authenticating a product using a magnetic code, comprising;
   detecting a magnetic code encoded within a magnetizable material on the product using a personal computing device comprising a sensor and having a surface substantially covered in a material having a high magnetic permittivity with an opening in the surface adjacent to the sensor;
   correlating the detected magnetic code to a symbolic code;
   determining whether the symbolic code matches a symbolic code stored in a database; and
   receiving, by the personal computing device, a signal indicating that the consumer product is authentic if the symbolic code matches the symbolic code stored in the database.

2. The method of claim 1, wherein the sensor is a Hall Effect sensor.

3. The method of claim 1, wherein the sensor comprises a magnetometer.

4. The method of claim 1, wherein the personal computing device comprises a smartphone.

5. The method of claim 1, wherein the material having a high magnetic permittivity is mu-metal.

6. The method of claim 1, wherein the magnetic code comprises a barcode encoded in a magnetized material.

7. The method of claim 1, wherein the magnetic code comprises magnetized ink.

8. The method of claim 7, wherein the magnetized ink is printed onto a label disposed on the product.

9. The method of claim 1, wherein the magnetized material includes at least one piece of a high magnetic permittivity material disposed thereon.

10. The method of claim 1, wherein the symbolic code is a graphical image.

11. The method of claim 1, further comprising scanning a QR code prior to detecting the magnetic code on the product.

12. The method of claim 1, wherein the signal indicating that the product is authentic includes an image.

13. The method of claim 1, wherein detecting the magnetic code on the product comprises detecting an orientation or a magnitude of a magnetic field pattern.

14. The method claim 13, wherein detecting the magnetic code on the product comprises detecting the orientation and the magnitude of the magnetic field pattern.

15. The method as claimed in claim 1 wherein said detecting a magnetic code encoded within a magnetizable material on the product using a personal computing device comprises moving the personal computing device over a surface of the product.

16. A method of printing a detectable magnetic code on a product, comprising:
    covering a first portion of a surface of a magnetization unit with at least one piece of a material having a high magnetic permittivity, wherein a second portion of the surface of the magnetization unit remains uncovered;
    placing the magnetization unit in contact with a piece of magnetizable material, such that a magnetic code is created in the magnetizable material in a pattern corresponding to the second portion of the surface of the magnetization unit; and
    placing the piece of the magnetizable material on the product, such that a device is configured to detect the magnetic code.

17. The method of claim 16, wherein the surface of the magnetization unit is substantially planar.

18. The method of claim 16, wherein the surface of the magnetization unit is round.

19. The method of claim 16, wherein the first portion of the surface of the magnetization unit is covered with at least two pieces of material having a high magnetic permittivity.

20. The method of claim 16, wherein the pattern corresponding to the second portion of the surface of the magnetization unit is a barcode.

21. The method of claim 16, wherein the magnetizable material is disposed on the product.

22. The method of claim 16, wherein the magnetizable material is disposed behind a label on packaging of the product.

23. The method of claim 16, wherein the device determines whether the product is authentic using the magnetic code.

24. The method of claim 16, wherein the device compares the magnetic code with a code stored in a database.

25. A method for authenticating a product using a magnetic code or image, comprising:
    visually detecting a magnetic code or image encoded within a magnetizable material on a product using a magnetic optically sensitive material;
    scanning the visually detected magnetic code or image using a personal computing device comprising a sensor and having a surface substantially covered in a material having a high magnetic permittivity with an opening in the surface adjacent to the sensor;

correlating the scanned visually detected magnetic code or image to a symbolic code;

determining whether the symbolic code matches a symbolic code stored in a database; and receiving, by the device, a signal indicating that the product is authentic if the symbolic code matches the symbolic code stored in the database.

26. The method of claim 25, wherein the visually detected magnetic code or image is a barcode.

27. The method of claim 25, wherein the sensor is a barcode scanner for scanning the visually detected magnetic code or image.

28. The method of claim 25, wherein the sensor is a camera for scanning the visually detected magnetic code or image.

29. The method as claimed in claim 25 wherein said scanning the visually detected magnetic code or image using a personal computing device comprises moving the personal computing device over a surface of the product.

* * * * *